US012011934B2

(12) United States Patent
Kim et al.

(10) Patent No.: US 12,011,934 B2
(45) Date of Patent: Jun. 18, 2024

(54) SUBSTRATE PROCESSING APPARATUS AND THE METHOD THEREOF

(71) Applicant: SEMES CO., LTD., Chungcheongnam-do (KR)

(72) Inventors: Sung Ho Kim, Chungcheongnam-do (KR); Yoon Ok Jang, Chungcheongnam-do (KR); Bo Yeon Hwang, Chungcheongnam-do (KR); Hyun Min Lee, Chungcheongnam-do (KR); Kwang Jun Choi, Chungcheongnam-do (KR)

(73) Assignee: SEMES CO., LTD., Cheonan-si (KR)

( * ) Notice: Subject to any disclaimer, the term of this patent is extended or adjusted under 35 U.S.C. 154(b) by 0 days.

(21) Appl. No.: 17/870,840

(22) Filed: Jul. 22, 2022

(65) Prior Publication Data

US 2023/0068295 A1 Mar. 2, 2023

(30) Foreign Application Priority Data

Aug. 24, 2021 (KR) ........................ 10-2021-0111471

(51) Int. Cl.
*B41J 2/205* (2006.01)
*B41J 2/21* (2006.01)

(52) U.S. Cl.
CPC ........... *B41J 2/2054* (2013.01); *B41J 2/2132* (2013.01); *B41J 2/2142* (2013.01)

(58) Field of Classification Search
CPC ...... B41J 2/2054; B41J 2/2052; B41J 29/393; B41J 2029/3935; B41J 2/2132; B41J 2/2142; B41J 2/04535; B41J 2/0456; B41J 2/2121; B41J 2/2125; B41J 2/2128; B41J 2/5054; B41J 2/205; B41J 2/2056; B41J 2/52; B41J 2002/2058; G01J 1/02;
(Continued)

(56) References Cited

U.S. PATENT DOCUMENTS

| | | | |
|---|---|---|---|
| 6,290,352 | B1 | 9/2001 | Marumoto et al. |
| 8,995,022 | B1 | 3/2015 | Vronsky et al. |

(Continued)

FOREIGN PATENT DOCUMENTS

| | | |
|---|---|---|
| JP | 10-315510 | 12/1998 |
| JP | 2017-507768 | 3/2017 |

(Continued)

OTHER PUBLICATIONS

Office Action dated Sep. 26, 2023 for Japanese Patent Application No. 2022-130388 and its English translation from Global Dossier.

(Continued)

*Primary Examiner* — Kristal Feggins
(74) *Attorney, Agent, or Firm* — Ladas & Parry, LLP

(57) ABSTRACT

A substrate processing apparatus and a substrate processing method are provided, which can improve the yield by minimizing the occurrence of stains. The substrate processing method includes forming on the substrate a plurality of ink patterns spaced apart from each other by jetting ink onto the substrate by using a plurality of nozzles, calculating the density of each of the plurality of ink patterns, and selecting at least one nozzle for jetting ink into one pixel area based on respectively calculated densities of the plurality of ink patterns.

5 Claims, 11 Drawing Sheets

(58) Field of Classification Search
CPC .......... G01N 15/0205; G02F 1/133516; H04N 1/4051; H04N 1/4055
See application file for complete search history.

(56) References Cited

U.S. PATENT DOCUMENTS

| | | | |
|---|---|---|---|
| 9,496,519 B2 | 11/2016 | Vronsky et al. | |
| 9,755,186 B2 | 9/2017 | Vronsky et al. | |
| 9,806,298 B2 | 10/2017 | Vronsky et al. | |
| 9,831,473 B2 | 11/2017 | Vronsky et al. | |
| 10,522,425 B2 | 12/2019 | Vronsky et al. | |
| 10,586,742 B2 | 3/2020 | Vronsky et al. | |
| 10,811,324 B2 | 10/2020 | Vronsky et al. | |
| 11,088,035 B2 | 8/2021 | Vronsky et al. | |
| 11,456,220 B2 | 9/2022 | Vronsky et al. | |
| 11,551,982 B2 | 1/2023 | Vronsky et al. | |
| 2005/0099439 A1 * | 5/2005 | Folkins | B41J 2/0057 347/8 |

FOREIGN PATENT DOCUMENTS

| | | |
|---|---|---|
| JP | 2017-159476 | 9/2017 |
| KR | 10-2010-0110323 | 10/2010 |
| KR | 10-2012-0037567 | 4/2012 |
| KR | 10-2018-0091883 | 8/2018 |
| KR | 10-2019-0138705 | 12/2019 |
| KR | 10-2021-0044431 | 4/2021 |

OTHER PUBLICATIONS

Office Action dated Jul. 25, 2023 for Korean Patent Application No. 10-2021-0111471 and its English translation from Global Dossier.

* cited by examiner

SUBSTRATE PROCESSING APPARATUS AND THE METHOD THEREOF

CROSS-REFERENCE TO RELATED APPLICATION

This application claims priority from Korean Patent Application No. 10-2021-0111471 filed on Aug. 24, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a substrate processing apparatus and the method thereof.

2. Description of the Related Art

A printing process, e.g., RGB patterning is performed on a substrate to manufacture a display device such as a liquid crystal display (LCD) panel, a plasma display panel (PDP), or a light-emitting diode (LED) panel. The printing process is performed by using printing equipment having an inkjet head.

SUMMARY

Then, quantum dot (QD) ink is added with various organic/inorganic substances to improve function. However, since these various additives are not uniformly mixed inside the inkjet head, a difference in the density of the additives may occur between inkjets from a plurality of nozzles of the inkjet head. This incurs luminance non-uniformity or mura and reduces yield.

Aspects of the present disclosure provide a substrate processing method capable of improving the yield by minimizing the occurrence of mura.

Another aspect of the present disclosure provides a substrate processing apparatus capable of improving the yield by minimizing the occurrence of mura.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method of processing a substrate, including forming on the substrate a plurality of ink patterns spaced apart from each other by jetting ink onto the substrate by using a plurality of nozzles, calculating a density of each of the plurality of ink patterns, and selecting at least one nozzle for jetting ink into one pixel area based on respectively calculated densities of the plurality of ink patterns.

According to another aspect of the present disclosure, there is provided an apparatus for processing substrates, including a head, a first imaging module, and a control module. The head includes a plurality of nozzles and is configured to form on the substrate a plurality of ink patterns spaced apart from each other by jetting ink onto the substrate through the plurality of nozzles. The first imaging module is configured to perform generating a plurality of ink pattern images by imaging the plurality of ink patterns. The control module is configured to perform calculating the respective grayscale values of the plurality of ink pattern images and to select at least one nozzle for jetting ink into one pixel area based on calculated grayscale values.

According to yet another aspect of the present disclosure, there is provided an apparatus for processing one or more substrates, including a first stage, a second stage that is adjacent to the first stage, a gantry disposed to cross the first stage and the second stage, an inkjet head module, a first imaging module, and a control module. The inkjet head module is installed on the gantry, includes a plurality of nozzles, and is configured to jet ink in the first stage and the second stage. The first imaging module is installed on the gantry. The control module is configured to control the inkjet head module and the first imaging module. Here, the inkjet head module is configured to form a plurality of ink patterns by jetting ink onto one or more test substrates in the second stage. The first imaging module is configured to perform generating ink pattern images by imaging the ink patterns. The control module is configured to perform calculating the respective densities of the ink patterns from the ink pattern images.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
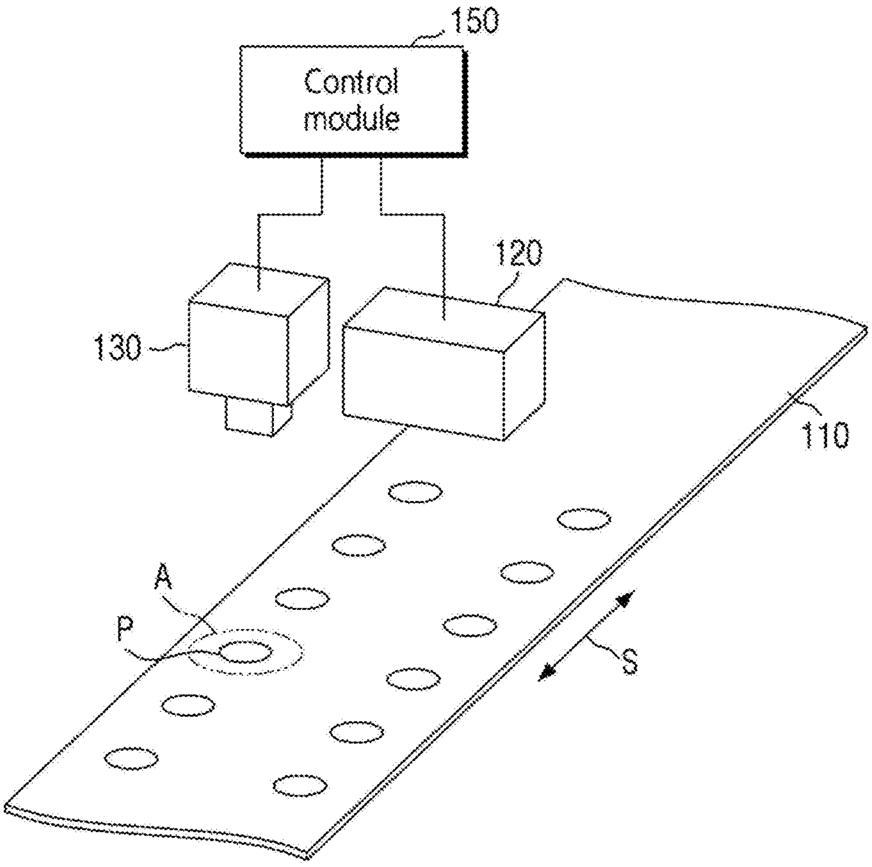
FIG. 1 is a conceptual diagram for explaining a substrate processing apparatus according to at least one embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Spatially relative terms, such as "below," "beneath," "lower," "above," "upper," and the like, may be used herein for ease of description to convey one element's or feature's relationship to another element(s) or feature(s) as illustrated in the drawings. It will be understood that the spatially relative terms are intended to encompass different orientations of the device in use or operation in addition to the orientation depicted in the drawings. For example, when a device in the drawings is turned over, elements described as "below" or "beneath" other elements or features would then be oriented "above" the other elements or features. Thus, the illustrative term "below" can encompass both an orientation of above and below. The device may be otherwise oriented (rotated 90 degrees or at other orientations), and the spatially relative descriptors used herein may be interpreted accordingly.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, first component, or first section discussed below could be termed a second element, a second component, or a second section without departing from the teachings of the present disclosure.

FIG. 1 is a conceptual diagram for explaining a substrate processing apparatus according to at least one embodiment of the present disclosure.

Referring to FIG. 1, the substrate processing apparatus according to at least one embodiment of the present disclosure includes a head 120, a first imaging module 130, and a control module 150.

The head 120 includes a plurality of nozzles. The head 120 is adapted to jet ink onto a substrate 110 through the plurality of nozzles to form on the substrate 110 a plurality of ink patterns P spaced apart from each other.

The substrate 110 may be a test substrate that can move in one direction (refer to reference numeral S) as shown and may have a flexible property but is not limited thereto. The substrate 110 may be a flexible substrate provided in a roll-to-roll method. Alternatively, the substrate 110 may be a substrate having a hard property, such as a glass substrate.

The ink pattern P is formed on the substrate 110 by the ink jetted from the head 120. Ink patterns P may each correspond to each of the plurality of nozzles of the head 120. For example, one nozzle may jet once into one jetting area A to generate one ink pattern P, or one nozzle may jet multiple times within one jetting area A to generate one ink pattern P.

Figure 3:
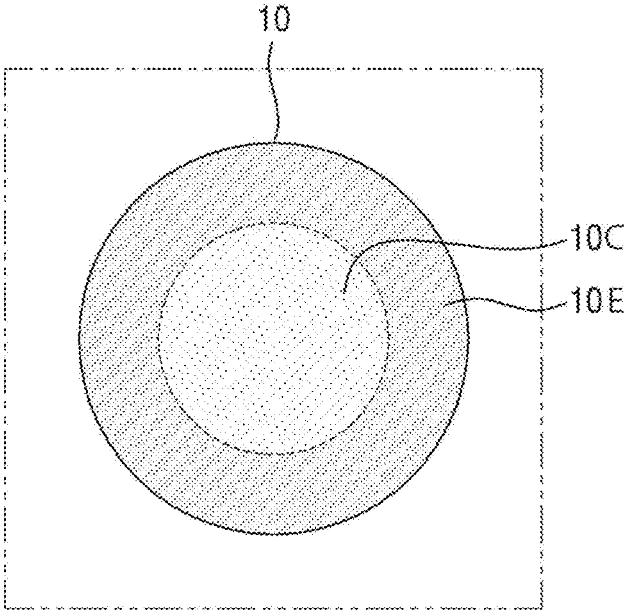
FIGS. 3 to 5 are conceptual diagrams for explaining the method of FIG. 2.

The first imaging module 130 photographs or images the ink pattern P to generate an ink pattern image 10 (FIG. 3). The first imaging module 130 may include, but is not limited to, a camera, for example. Anything may be used as long as it can generate the ink pattern image 10.

The control module 150 calculates, based on the generated ink pattern images 10, the densities of the respective corresponding ink patterns P. As will be detailed below, the control module 150 calculates grayscale values of the respective ink pattern images 10 and calculates the densities based on the grayscale values. The control module 150 performs a nozzle mixing operation based on the calculated densities. To form one pixel within one pixel area, multiple nozzles are used. In other words, multiple nozzles jet ink into the one pixel area, resulting in one complete pixel. Nozzle mixing operation means selecting at least one nozzle for jetting ink into one pixel area and using the selected at least one nozzle to jet ink to the pixel area.

Additionally, the control module 150 may control the operation of the head 120 and the operation of the first imaging module 130. The control module 150 may further control the operation of the substrate 110.

The operation of the substrate processing apparatus according to at least one embodiment of the present disclosure is summarized as follows.

Figure 6:
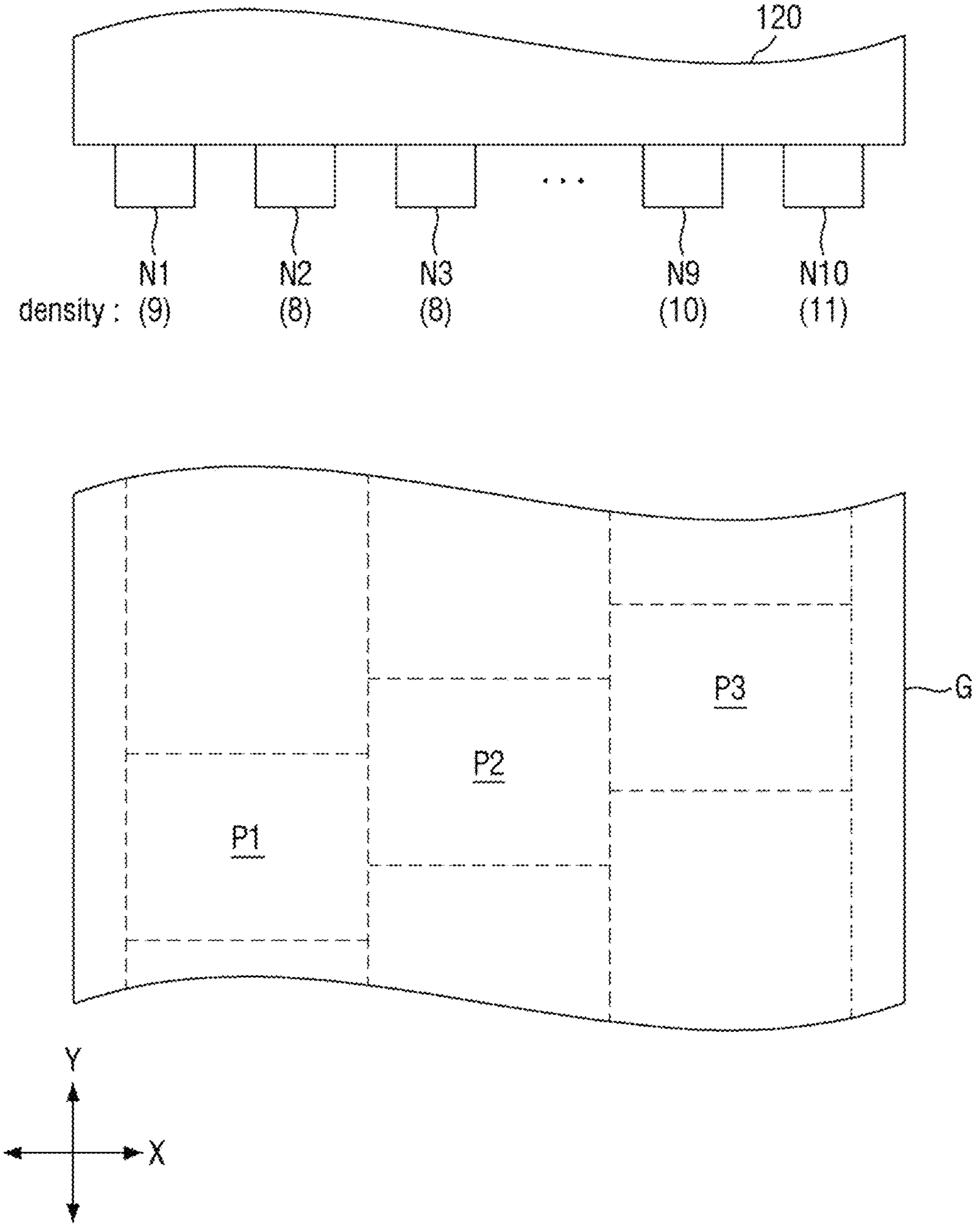
FIG. 6 is a conceptual diagram for explaining a nozzle mixing operation.

First, the head 120 uses multiple nozzles to jet ink onto the substrate 110 to form thereon multiple ink patterns P spaced apart from each other. Then, the control module 150 calculates the densities of the respective ink patterns P. Then, the control module 150 performs nozzle selection, that is, a nozzle mixing operation, based on the calculated densities of the respective ink patterns P, for selecting at least one of the nozzles for jetting ink within a single pixel area, for example, selecting at least one of nozzles N1 to N10 for jetting ink within one of pixel areas P1, P2, and P3 as shown in FIG. 6.

The following describes a method of calculating the densities of the respective ink patterns P by referring to FIGS. 2 to 5.

Figure 2:
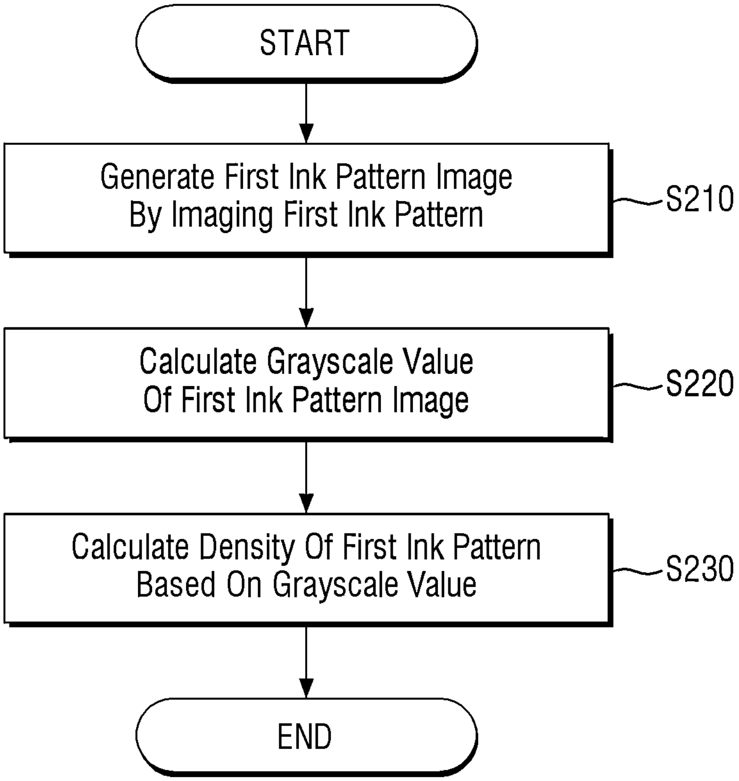
FIG. 2 is a flowchart of a method of calculating the densities of respective ink patterns in a substrate processing method according to some embodiments of the present disclosure.
Figure 4:
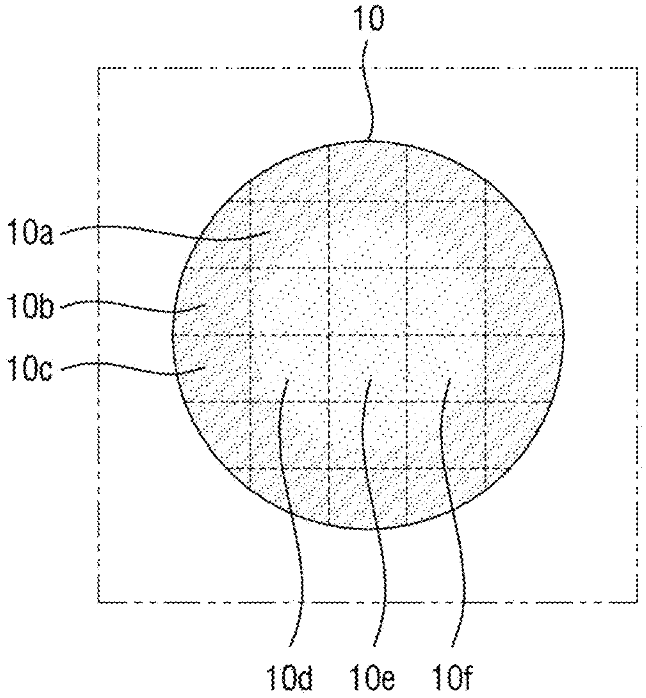
Figure 5:
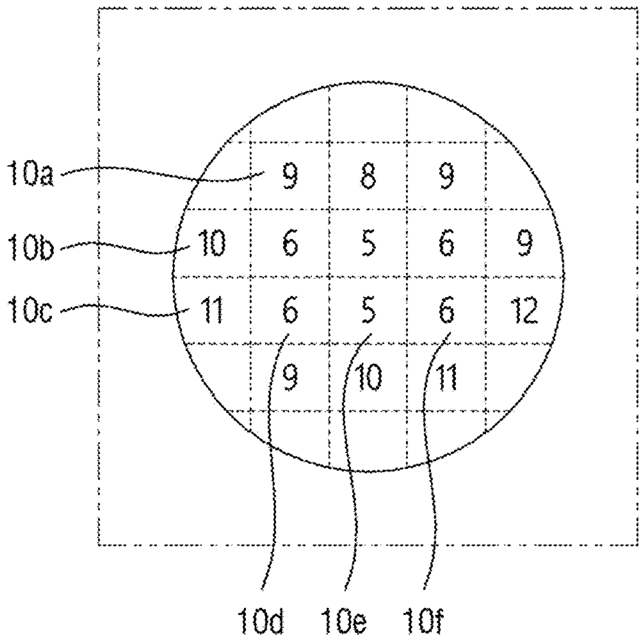

FIG. 2 is a flowchart of a method of calculating the densities of the respective ink patterns P in a substrate processing method according to some embodiments of the present disclosure. FIGS. 3 to 5 are conceptual diagrams for explaining the method of FIG. 2.

Referring to FIGS. 1 and 2, after the head 120 forms on the substrate 110 a plurality of ink patterns P spaced apart from each other, the first imaging module 130 images a first ink pattern that is any one of the ink patterns P to generate a first ink pattern image 10 (Step S210 in FIG. 2).

The first ink pattern image 10 may be as shown in FIG. 3. For example, the first ink pattern image 10 may have a brighter center region 10C, and a relatively darker edge region 10E. A region that is in the first ink pattern P and has a congregation of additives (e.g., inorganic substances) appears relatively dark in the first ink pattern image 10 as illustrated by the edge region 10E. Conversely, a region that is in the first ink pattern P and has a small amount of additives appears relatively bright in the first ink pattern image 10 as illustrated by the center region 10C.

The first ink pattern image 10 may be displayed in grayscale. For example, the first ink pattern image 10 may be captured in grayscale by the first imaging module 130, or it may be first captured in color by the first imaging module 130 and then changed to grayscale by the control module 150.

Then, the control module 150 calculates a grayscale value of the first ink pattern image 10 (Step S220 in FIG. 2).

Specifically, as shown in FIG. 4, the control module 150 divides the first ink pattern image 10 into a plurality of image portions 10*a* to 10*f*. For example, the control module 150 arranges multiple horizontal lines and multiple vertical lines to intersect each other in the first ink pattern image 10 and generates areas defined by the horizontal lines and the vertical lines, although the present disclosure is not limited to the illustrated image division. Additionally, the control module 150 configures each one of the image portions 10*a* to 10*f* to have a substantially rectangular shape, but the present disclosure is not limited thereto. Each one of the image portions 10*a* to 10*f* may have a substantially triangular shape or a pentagonal shape.

Additionally, as shown in FIG. 5, the control module 150 determines the grayscale values of the respective image portions 10*a* to 10*f* and thereby generates multiple partial grayscale values. For example, the partial grayscale values of the respective image portions 10*a*, 10*b*, 10*c*, 10*d*, 10*e*, 10*f* may be 9, 10, 11, 6, 5, 6, or the like. For example, the image portions 10*d*, 10*e*, and 10*f* located in the center region 10C of the first ink pattern image 10 have relatively small partial grayscale values, and the image portions 10*a*, 10*b*, and 10*c* located in the edge region 10E may have relatively large partial grayscale values. These partial grayscale values are exemplary and not limiting. Contrary to the illustration, in some ink patterns P, the image portions 10*d*, 10*e*, and 10*f* located in the center area 10C may have relatively large partial grayscale values, and the image portions 10*a*, 10*b*, and 10*c* located in the edge area 10E may have relatively small partial grayscale values.

Additionally, the control module 150 determines the grayscale value of the entire first ink pattern image 10 based on the plurality of partial grayscale values.

For example, the control module 150 may determine a grayscale value of the first ink pattern image 10 by averaging the multiple partial grayscale values, which is equivalent to using an arithmetic average. Alternatively, the control module 150 may determine a grayscale value of the first ink pattern image 10 by assigning a weight to a specific region, for example, by giving relatively high weight to partial grayscale values corresponding to the edge region 10E, which is equivalent to using a weighted average. The control module 150 may determine the grayscale value of the first ink pattern image 10 by using a method other than using the arithmetic average and using the weighted average.

Subsequently, the control module 150 calculates the density of the first ink pattern P based on the determined grayscale value of the first ink pattern image 10 (S230 in FIG. 2).

Specifically, the control module 150 may determine the density of the first ink pattern P to correspond to the grayscale value of the first ink pattern image 10.

As described above, the region with a congregation of additives (e.g., inorganic substances) in the first ink pattern P appears relatively dark in the first ink pattern image 10. Conversely, a region in the first ink pattern P with few additives appears relatively bright in the first ink pattern image 10. Accordingly, the density of the first ink pattern P may be determined in proportion to the grayscale value of the first ink pattern image 10. For example, in response to an increase in the grayscale value of the first ink pattern image 10, the density value of the first ink pattern P may be determined to be large. Alternatively, the grayscale value of the first ink pattern image 10 may be determined in proportion to the density of the first ink pattern P.

The following refers to FIG. 6 for describing a method of performing nozzle selection, that is, the nozzle mixing operation, based on the calculated densities of the respective ink patterns P, for selecting at least one of nozzles N1 to N10 for jetting ink within one of pixel areas P1, P2, and P3.

FIG. 6 is a conceptual diagram for explaining the nozzle mixing operation.

Referring to FIG. 6, the nozzles N1 to N10 are installed in the head 120. In the method described with reference to FIGS. 1 to 5, the densities of ink for the respective nozzles N1 to N10 were measured. For example, it is assumed that the density of ink jetted from the first nozzle N1 is 9, the density of ink from the second nozzle N2 is 8, the density of ink from the third nozzle N3 is 8, and the density of ink from the third nozzle N3 is 8, the density of ink from the ninth nozzle N9 is 10, and the density of ink from the tenth nozzle N10 is 11.

For the convenience of description, it is assumed that the volumes of ink jetted from the respective nozzles N1 to N10 are the same. For example, 1 is assumed to be the volume of ink jetted from each of the nozzles N1 to N10.

For example, a substrate G is defined with the pixel areas P1, P2, and P3.

The head 120 may move in first directions X, that is, in the left and right directions in the drawing. The substrate 110 may move in second directions Y, that is, in the vertical direction in the drawing.

Here, the pixels are assumed to be completed only when the ink of volume 3 is jetted to the pixel areas P1, P2, and P3, respectively. Since volume 1 of ink is jetted from each one of nozzles N1 to N10, the ink needs to be jetted three times to one pixel area, e.g., P1.

To set the density of the ink in the pixel area P1 to 10, the control module 150 may select, as nozzles for jetting the ink in the pixel area P1, the first nozzle N1, the ninth nozzle N9, and the tenth nozzle N10. The three selected nozzles N1, N9, and N10 each jet ink once to the pixel area P1. Then, the volume is set to 3, i.e., 1+1+1=3, and the density is set to 10, i.e., (9+10+11)/3=10.

Alternatively, to set the density of ink in the pixel area P2 to 9, the control module 150 may select, as nozzles for jetting the ink in the pixel area P2, the first nozzle N1, the third nozzle N3, and the ninth nozzle N9. The three selected nozzles N1, N3, and N9 each jet ink once to the pixel area P2. Then, the volume is set to 3, i.e., 1+1+1=3, and the density is set to 9, i.e., (9+8+10)/3=9. Since the density of ink jetted from the second nozzle N2 is the same as that from the third nozzle N3, a selection of N1, N2, and N9 may be made in place of the selection of N1, N3, and N9.

As described above, at least one of the nozzles N1 to N10 may be selected based on the density for jetting ink into one of the pixel areas P1, P2, and P3.

Figure 7:
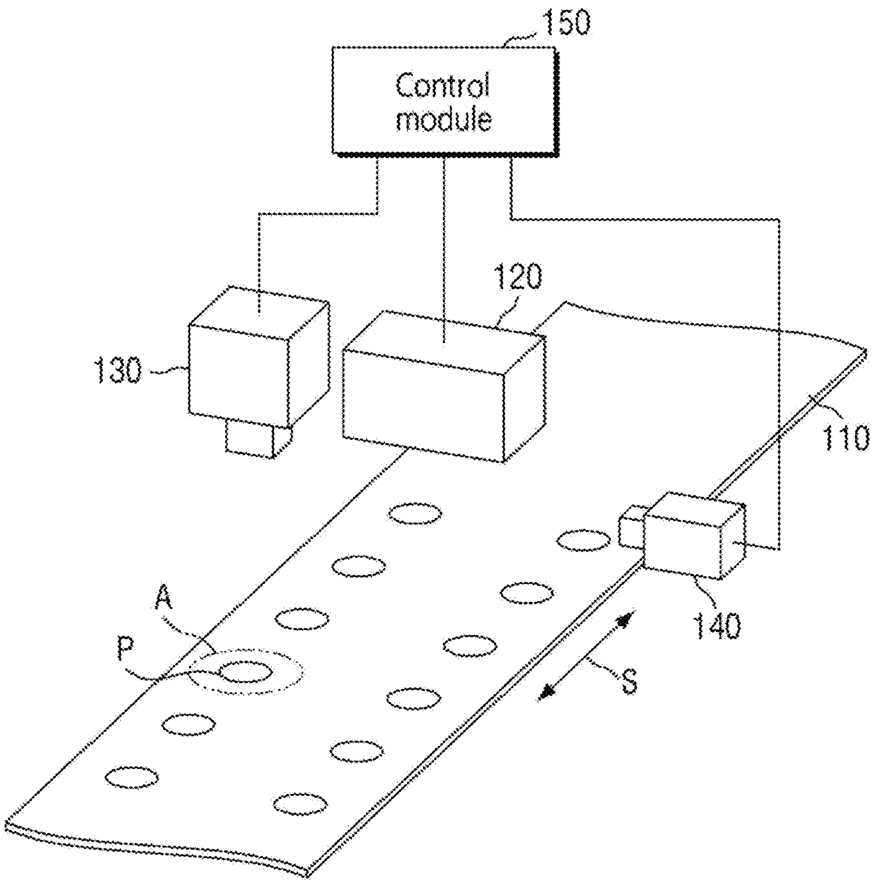
FIG. 7 is a conceptual diagram for explaining a substrate processing apparatus according to another embodiment of the present disclosure.
Figure 8:
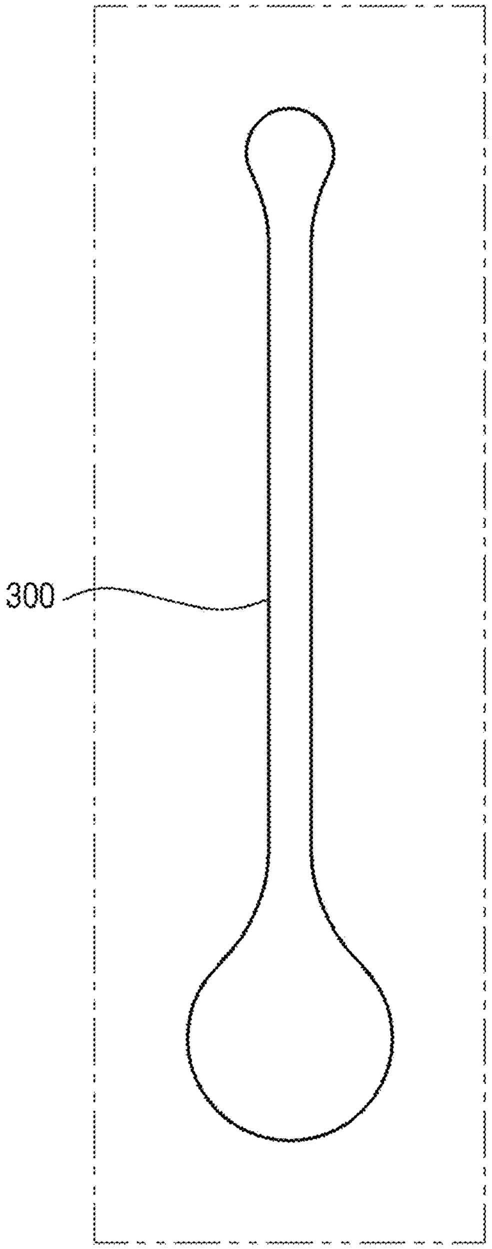
FIGS. 8 and 9 are diagrams for explaining a method of measuring the volume of ink.
Figure 9:
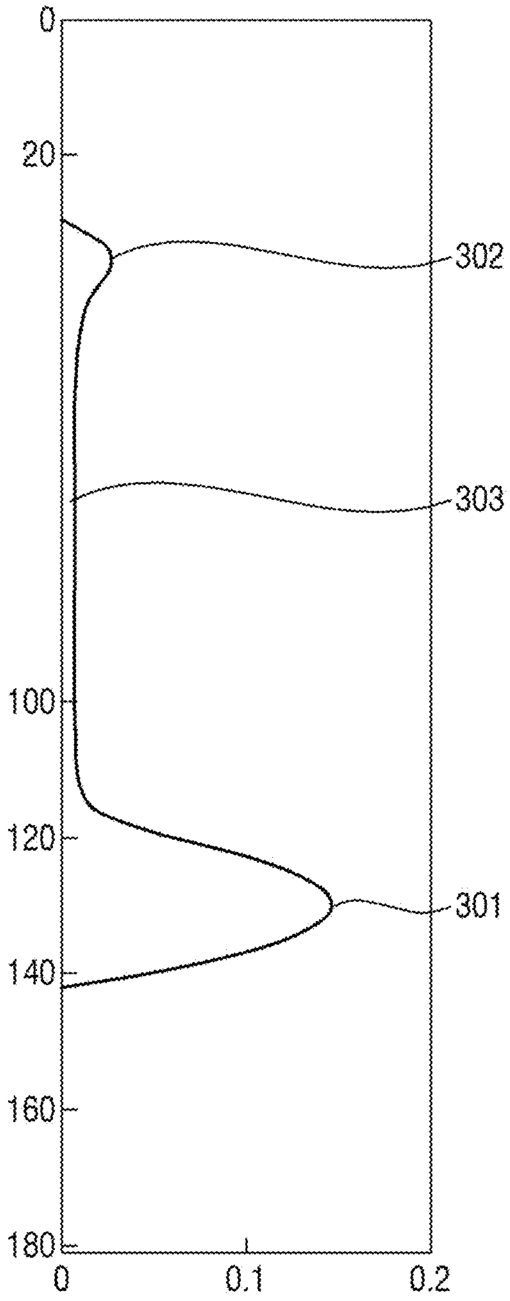

FIG. 7 is a conceptual diagram for explaining a substrate processing apparatus according to another embodiment of the present disclosure. FIGS. 8 and 9 are diagrams for explaining a method of measuring the volume of ink. For the convenience of explanation, the following focuses on the points different from those described with reference to FIGS. 1 to 6.

Referring first to FIG. 7, a substrate processing apparatus according to another embodiment of the present disclosure includes a head 120, a first imaging module 130, a second imaging module 140, and a control module 150, etc.

The head 120 jets ink on the substrate 110 through a plurality of nozzles to form on the substrate 110 a plurality of ink patterns P spaced apart from each other.

The first imaging module 130 captures the image of the ink patterns P on the substrate 110 to generate a plurality of ink pattern images (refer to 10 in FIG. 3).

The control module 150 calculates, based on the plurality of ink pattern images 10, the densities of the respective corresponding ink patterns P. As described above, the control module 150 calculates grayscale values of the respective ink pattern images 10 and calculates densities based on the grayscale values.

The second imaging module 140 images inkjets from the respective nozzles to generate a plurality of ink droplet images as shown in FIG. 8 by 300. The second imaging module 140 may include, but is not limited to, a camera, for example. Anything may be used as long as it can generate the ink droplet images 300.

In addition, the control module 150 calculates, based on the ink droplet images 300, the respective corresponding volumes of ink.

Here, FIG. 9 shows volumes by positions of the first ink droplet image among the multiple ink droplet images 300, wherein the first ink droplet image refers to any one of multiple ink droplet images. The y-axis of FIG. 9 means the distance away from the surface of the nozzle (unit: m), and the x-axis means the volume per pixel (volume/pixel by the unit of pL.

The control module 150 converts the ink droplet image as at 300 in FIG. 8 into its positionally equivalent volume graph as in FIG. 9, from which a main droplet 301 is determined. There may be various methods of finding the main droplet 301, but an example method may find the main droplet 301 based on a region in FIG. 9 having a rapidly rising slope or a rapidly dropping slope.

The control module 150 may calculate, based on the thus found volume of the main ink droplet 301, the volume of ink jetted from the nozzle. For example, the control module 150 may determine the volume of the main ink droplet 301 as the total volume of the ink. This is because the main droplet 301 contributes significantly to the total volume of the ink droplet, and the remaining portions except the main droplet 301, e.g., the satellite droplet 302, the connecting droplet 303, etc. contribute insignificantly to the total volume.

The control module 150 may control the operation of the head 120, and those of the first imaging module 130 and the second imaging module 140. The control module 150 may further control the operation of the substrate 110.

Figure 10:
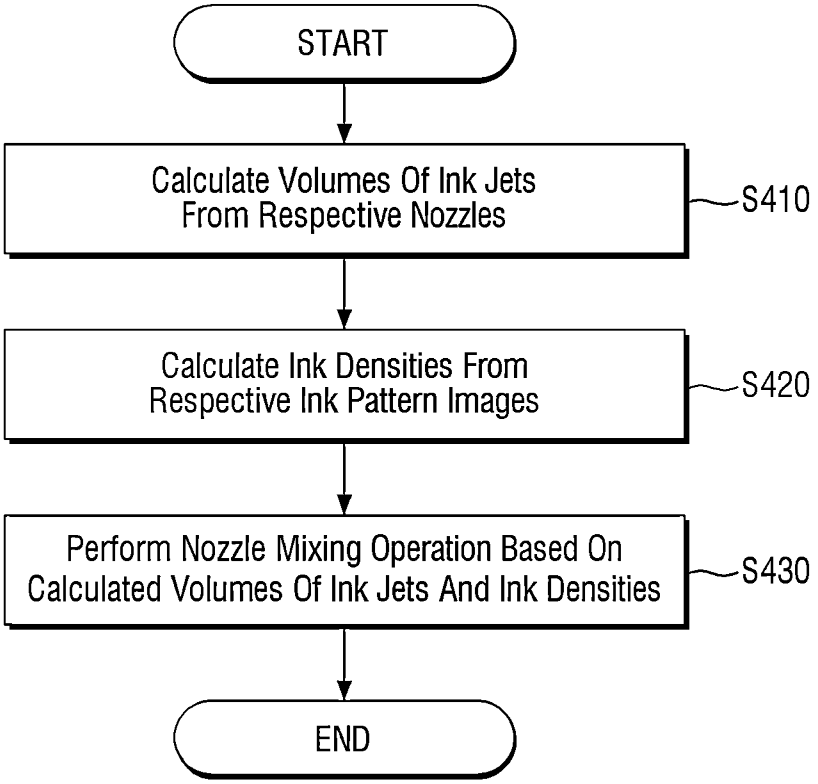
FIG. 10 is a flowchart for explaining an operation of the substrate processing apparatus according to another embodiment of the present disclosure.

The following summarizes the operation of the substrate processing apparatus according to another embodiment of the present disclosure. Referring to FIG. 10, the head 120 jets ink onto the substrate 110 by using a plurality of nozzles to form on the substrate 110*a* plurality of ink patterns P spaced apart from each other.

The second imaging module 140 images the ink jets of the ink when jetted from the multiple nozzles to generate ink droplet images as at 300 in FIG. 8. Then, the control module 150 calculates the volumes of ink from the ink droplet images 300 (S410).

The first imaging module 130 images a plurality of ink patterns P to generate ink pattern images as at 10 in FIG. 3. Then, the control module 150 calculates the densities of the ink from the respective ink pattern images 10 (S420).

Then, the control module 150 may perform nozzle selection, that is, a nozzle mixing operation, based on the grayscale values, i.e., ink densities of the respective ink pattern images and the volumes of the ink jetted from the respective nozzles, for selecting at least one of nozzles for jetting ink within a single pixel area (S430).

Here, by referring back to FIG. 6, the nozzle mixing operation will be described in detail. As described above, the densities of ink jetted from the nozzles N1, N2, N3, N9, and N10 are assumed to be 9, 8, 8, 10, and 11, respectively. Further, the volumes of ink jetted from the nozzles N1, N2, N3, N9, and N10 are assumed to be 1, 1.2, 0.8, 1.2, and 1, respectively.

For example, to set the density of ink in the pixel area P3 to 9, the control module 150 selects, as nozzles for jetting ink in the pixel area P3, the first nozzle N1, the third nozzle N3, and the ninth nozzle N9.

In particular, first, candidate usable nozzles are selected based on the densities. To set the density of ink in the pixel area P3 to 9, candidate nozzles N1, N2, N3, and N9 may be selected. Then, the final nozzles to be used are selected from among the nozzle candidates based on the volumes. The volume of ink in one pixel area P3 needs to be set to 3, so N3 is more suitable than N2. Therefore, the final nozzles to be used are N1, N3, and N9.

Three selected nozzles N1, N3, and N9 each jet ink once to the pixel area P2. Then the volume is set to 3, i.e., 1+0.8+1.2=3, and the density is set to 9, i.e., (9+8+10)/3=9.

Figure 11:
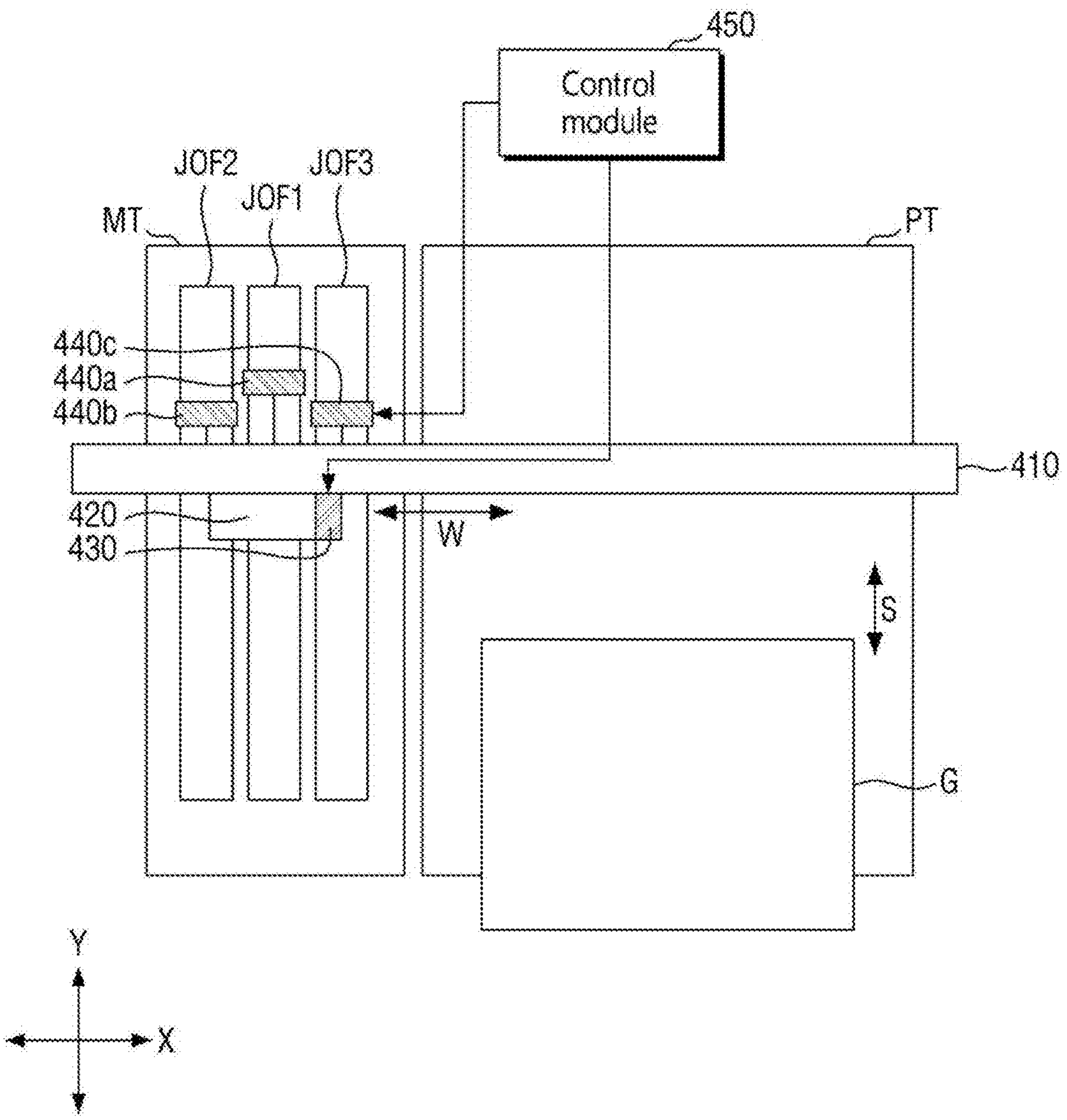
FIG. 11 is a diagram illustrating a substrate processing apparatus according to yet another embodiment of the present disclosure.

FIG. 11 is a diagram illustrating a substrate processing apparatus according to yet another embodiment of the present disclosure.

Referring to FIG. 11, a substrate processing apparatus according to yet another embodiment of the present disclosure includes a first stage PT, a second stage MT, a gantry 410, an inkjet head module 420, first imaging modules 440*a*, 440*b*, 440*c*, a second imaging module 430, test substrates JOF1, JOF2, JOF3, and a substrate G, and the like.

The first stage PT is an area for supporting and moving the substrate G. A method of moving the substrate G in the first stage PT is not limited to a specific method. For example, the holder may hold and move the substrate G, or may move the substrate G by an air floating method. The substrate G may move in second directions Y The substrate G may have, for example, a glass substrate.

The second stage MT may be disposed adjacent to the first stage PT in a first direction X. Disposed in the second stage MT may be the test substrates JOF1, JOF2, and JOF3. The test substrates JOF1, JOF2, and JOF3 may each extend lengthwise in the second directions Y and arranged side by side. The test substrates JOF1, JOF2, and JOF3 are disposed adjacent to each other in the first directions X. The test substrates JOF1, JOF2, and JOF3 may each have a flexible property, and may be provided in, for example, a roll-to-roll method.

The gantry 410 is disposed in the first stage PT and the second stage MT to cross both of them. The gantry 410 may extend lengthwise in the first directions X.

The inkjet head module 420 is installed on the gantry 410 and may move along the gantry 410 as indicated by arrow W. As illustrated, the inkjet head module 220 may move in the first directions X, but is not limited thereto. The inkjet head module 420 may include a plurality of heads for jetting ink, and the heads may each include a plurality of nozzles. The ink may be, for example, quantum dot (QD) ink, but is not limited thereto.

The first imaging modules 440*a*, 440*b*, 440*c* are formed on the gantry 410. The first imaging modules 440*a*, 440*b*, and 440*c* may each include a camera but are not limited thereto. The first imaging modules 440*a*, 440*b*, and 440*c* may be disposed at positions corresponding to the test substrates JOF1, JOF2, and JOF3.

The inkjet head module 420 jets ink to the test substrates JOF1, JOF2, and JOF3 to form thereon a plurality of ink patterns P. The first imaging modules 440*a*, 440*b*, and 440*c* capture the images of the ink patterns P to generate a plurality of ink pattern images as at 10 in FIG. 3. A control module 450 is provided to calculate grayscale values of multiples of the ink pattern image 10 and calculate the densities of the ink patterns based on the grayscale values.

The second imaging module 430 is installed on the gantry 410 and is disposed adjacent to the inkjet head module 420. The second imaging module 430 may move in unison with the inkjet head module 420 along the gantry 410. The second imaging module 430 images the ink jets from the respective nozzles to generate a plurality of ink droplet images represented as at 300 in FIG. 8. The control module 450 may calculate volumes of the ink jets from multiples of the ink droplet image 300.

The control module 450 may perform a nozzle mixing operation by using the calculated densities and volumes.

Meanwhile, calculating the ink densities may be performed more frequently than calculating the ink volumes.

Since the ink volume principally changes according to the state of the nozzle, it changes relatively infrequently. On the other hand, since the ink density changes according to the mixing degree of the additives in the ink, it may change easier than the ink volume. Accordingly, where the control module 150 can use the ink volume data according to the nozzles for a first period, the control module 150 can use the ink density data according to the nozzles only for a shorter second period than the first period.

For example, after the processed substrate G is unloaded from the first stage PT and before a new substrate G to be processed is loaded into the first stage PT, the inkjet head module 420 moves to the second stage MT and jets ink on the test substrates JOF1, JOF2, and JOF3 to form ink patterns. The first imaging modules 440*a*, 440*b*, and 440*c* perform imaging the ink patterns to generate ink pattern images. Whenever a new substrate G is loaded into the first stage PT, the control module 150 may generate ink density data according to the nozzles.

On the other hand, only during a preset period such as a setting period or a maintenance period of the substrate processing apparatus, the second imaging module 140 may perform imaging the inkjets to generate ink droplet images. Namely, the control module 150 may generate ink volume data according to the nozzles only at a preset time or at regular intervals.

The control module 150 performs the nozzle mixing operation by using the ink density data and ink volume data thus generated.

While some embodiments of the present disclosure have been particularly shown and described with reference to the accompanying drawings, it will be understood by those of ordinary skill in the art that various changes in form and details may be made therein without departing from the technical idea and scope of the present disclosure as defined by the following claims.

The invention claimed is:

1. A method of processing a substrate, comprising:

forming on the substrate a plurality of ink patterns spaced apart from each other by jetting ink onto the substrate by using a plurality of nozzles;

calculating a density of each of the plurality of ink patterns; and selecting at least one nozzle for jetting ink into one pixel area based on respectively calculated densities of the plurality of ink patterns.

2. The method of claim 1, further comprising:

measuring respective volumes of ink jetted from the plurality of nozzles.

3. The method of claim 2, wherein the measuring of the respective volumes of ink jetted from the plurality of nozzles comprises:

imaging an inkjet of the ink when jetted from each of the plurality of nozzles; and calculating the respective volumes of ink jetted from the plurality of nozzles based on volumes of main droplets in imaged inkjets.

4. The method of claim 2, further comprising:

selecting at least one nozzle for jetting ink into one pixel area based on the respectively calculated densities of the plurality of ink patterns and the respective volumes of ink jetted from the plurality of nozzles.

5. The method of claim 1, wherein the substrate comprises:

a flexible substrate provided in a roll-to-roll method.

* * * * *